No. 834,109. PATENTED OCT. 23, 1906.
G. COTHRAN.
GAS GENERATOR.
APPLICATION FILED JULY 6, 1905.

No. 834,109. PATENTED OCT. 23, 1906.
G. COTHRAN.
GAS GENERATOR.
APPLICATION FILED JULY 6, 1905.

Witnesses:
Wm. P. Bond
Oscar W. Bond

Inventor
Grove Cothran
By Banning & Banning
Attys.

No. 834,109. PATENTED OCT. 23, 1906.
G. COTHRAN.
GAS GENERATOR.
APPLICATION FILED JULY 6, 1905.

No. 834,109. PATENTED OCT. 23, 1906.
G. COTHRAN.
GAS GENERATOR.
APPLICATION FILED JULY 6, 1905.

Witnesses:
Wm. P. Bond
Oscar W Bond

Inventor
Grove Cothran
By Banning & Banning
Attys.

THE NORRIS PETERS CO., WASHINGTON, D. C.

No. 834,109. PATENTED OCT. 23, 1906.
G. COTHRAN.
GAS GENERATOR.
APPLICATION FILED JULY 6, 1905.

Witnesses:
Wm P. Bond
Oscar W Bond

Inventor
Grove Cothran
By Banning Banning
Attys.

No. 834,109. PATENTED OCT. 23, 1906.
G. COTHRAN.
GAS GENERATOR.
APPLICATION FILED JULY 6, 1905.

Witnesses:
Wm. P. Bond
Oscar W. Bond

Inventor
Grove Cothran
By Banning & Banning
Attys.

UNITED STATES PATENT OFFICE.

GROVE COTHRAN, OF CHICAGO, ILLINOIS, ASSIGNOR TO CHICAGO TITLE AND TRUST COMPANY, TRUSTEE, A CORPORATION OF ILLINOIS.

GAS-GENERATOR.

No. 834,109.   Specification of Letters Patent.   Patented Oct. 23, 1906.

Application filed July 6, 1905. Serial No. 268,313.

*To all whom it may concern:*

Be it known that I, GROVE COTHRAN, a citizen of the United States, residing at Chicago, in the county of Cook and State of Illinois, have invented certain new and useful Improvements in Gas-Generators, of which the following is a specification.

This invention relates more particularly to an apparatus designed for the manufacture of carbureted water-gas for heating and illuminating purposes, and has for its objects to construct an apparatus by means of which a longer period of time for generating the gas can be obtained under one firing and by which an increase of the quantity of gas produced from the liquid hydrocarbon and incandescent materials can be largely increased; to construct an apparatus the several parts of which are located and arranged in a compact form and so that the apparatus for generating the gas will occupy but a small space as compared with the ordinary generators of gas apparatus; to enable the steam to be superheated from the heat of the generator and to be projected with a quantity of oil or other liquid hydrocarbon into the generator for vaporization purposes; to inject steam with a small quantity of air below the fire-box to pass up through the incandescent material in such manner as to thoroughly disintegrate the steam and maintain the coal or coke within the furnace at an incandescent heat for an increased period of time as compared with the time ordinarily obtained in gas-generating apparatus; to enable air to be utilized for blowing up the coal or coke and after the condition of the fuel has reached the incandescent point close the air-supply and admit steam with a small quantity of air through the blowpipe for the steam and air to pass up through the fuel into the generating-chamber for mixture with the vaporized oil or other hydrocarbon; to improve the construction and arrangement of the generating-chamber, by which the eduction of the vapor to form the gas will be attained at a point below the apex of the fire-chamber, whereby increased heating effect is obtained for vaporizing and fixing purposes; to inject oil and steam into the vaporizing-chamber for producing the vapor for the gas under conditions by which a thorough vaporization will take place before the vapor is ejected from the vaporizing-chamber at the apex of the fire-chamber into the final fixing-chamber; to furnish a passage-way for the travel of the vapor from the fire-chamber to the point of exit from the final fixing-chamber, by which the vapor will be maintained under the effects of greater heat for an increased period of time, thereby producing a permanent and fixed gas, free from the vaporous matter, before the delivery into the water seal, making the gas of greater permanency, and reducing at the same time the by-products by the more thorough gasification of oils and other hydrocarbons; to bring the vaporized oil or hydrocarbon from the vaporizing-chamber to pass through the upper portion of the fire or fuel chamber in contact with the fuel for the more volatile portions to pass out through the educting flues or conduits into the final fixing-chamber, where all the vaporous products will be removed, leaving only the permanent gas; to burn in the fuel or fire chamber more or less of the residuum and non-gaseous products of the oils or liquid hydrocarbons, thereby producing heat, which assists in maintaining the heat in the generator for vaporizing the oils or hydrocarbons before passing into the final fixing-chamber, thus enabling the generator to be operated with a less quantity of fuel than ordinarily required for the purpose; to increase and maintain the heat within the fire or fuel chamber by the residuum and heavy products of the oils or hydrocarbons which are consumed by direct contact with the incandescent material in the upper portion of the fuel or fire chamber, thereby preventing the escape of the heavy and other by-products except the vapor and gas into the final fixing-chamber for delivery of a permanent gas only to the water seal, and to improve generally the construction and arrangement of the generator as a whole.

The invention consists in the features of construction and combination of parts hereinafter described and claimed.

Figure 1:
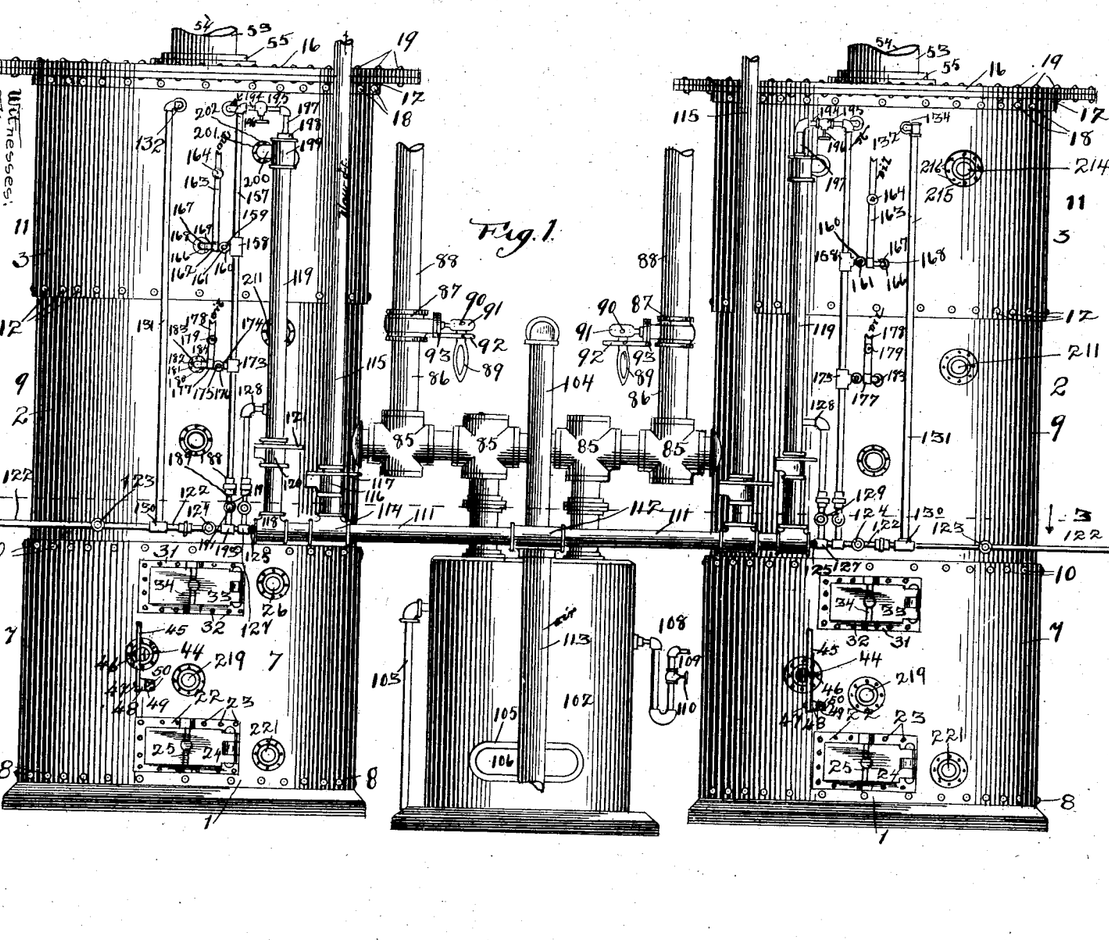
Figure 1 is a front elevation of an arrangement showing two generators and a water seal and embodying the features of the invention.
Figure 2:
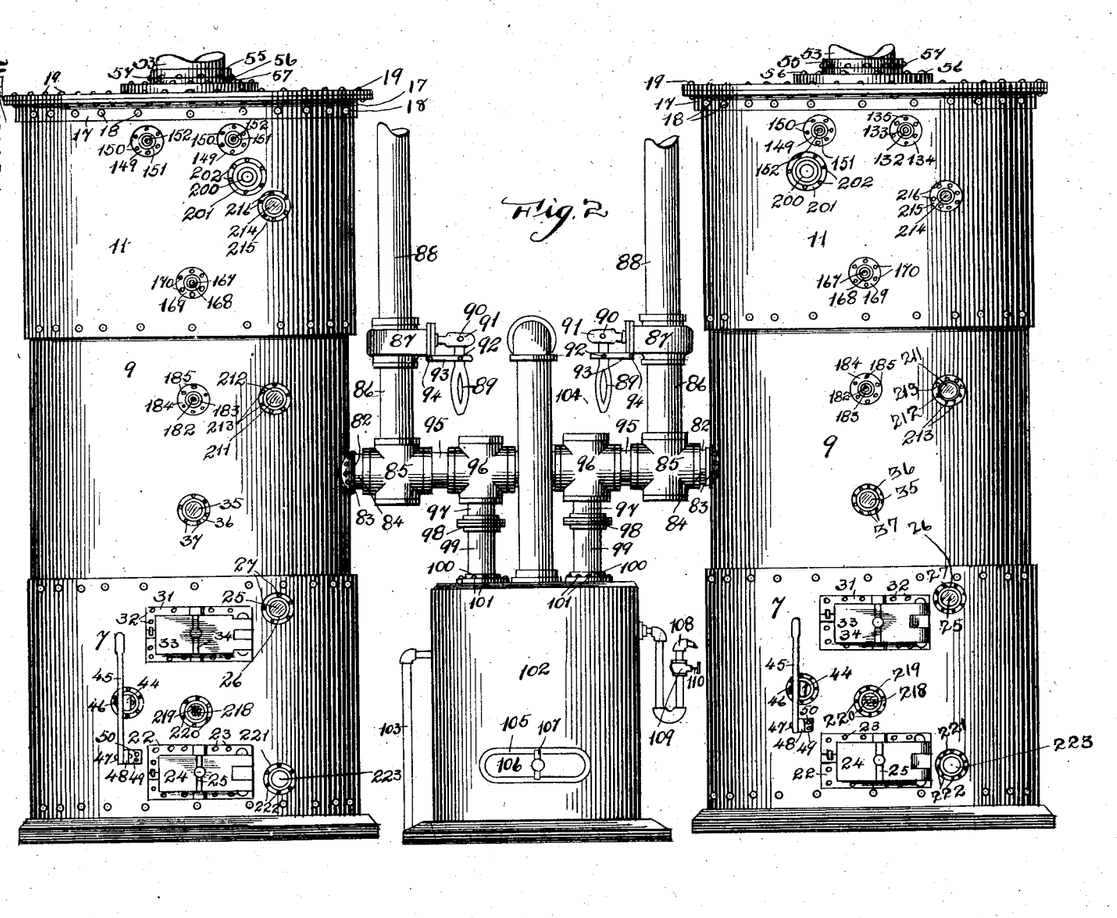
Fig. 2, a similar view to Fig. 1 with the air and steam pipes removed.
Figure 3:
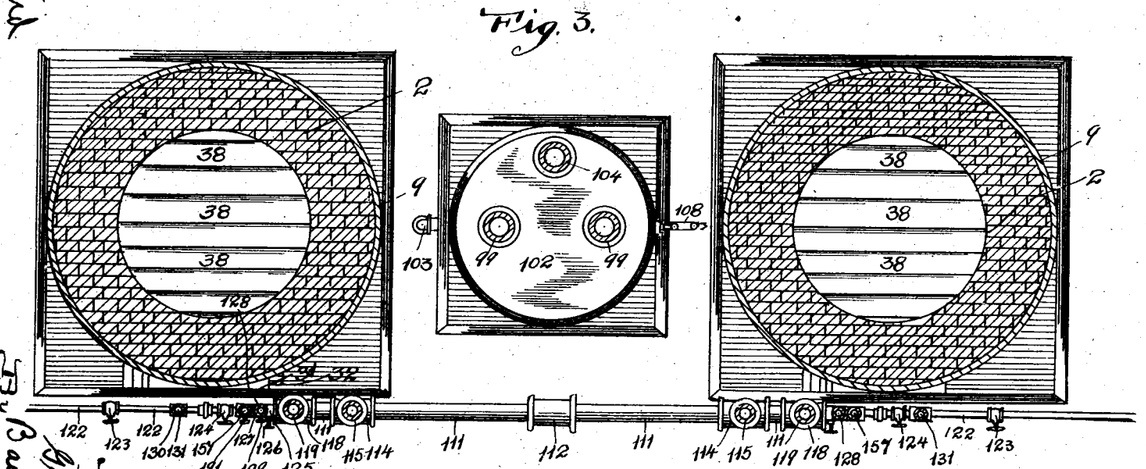
Fig. 3, a cross-section on line 3 of Fig. 1 looking in the direction of the arrow.
Figure 4:
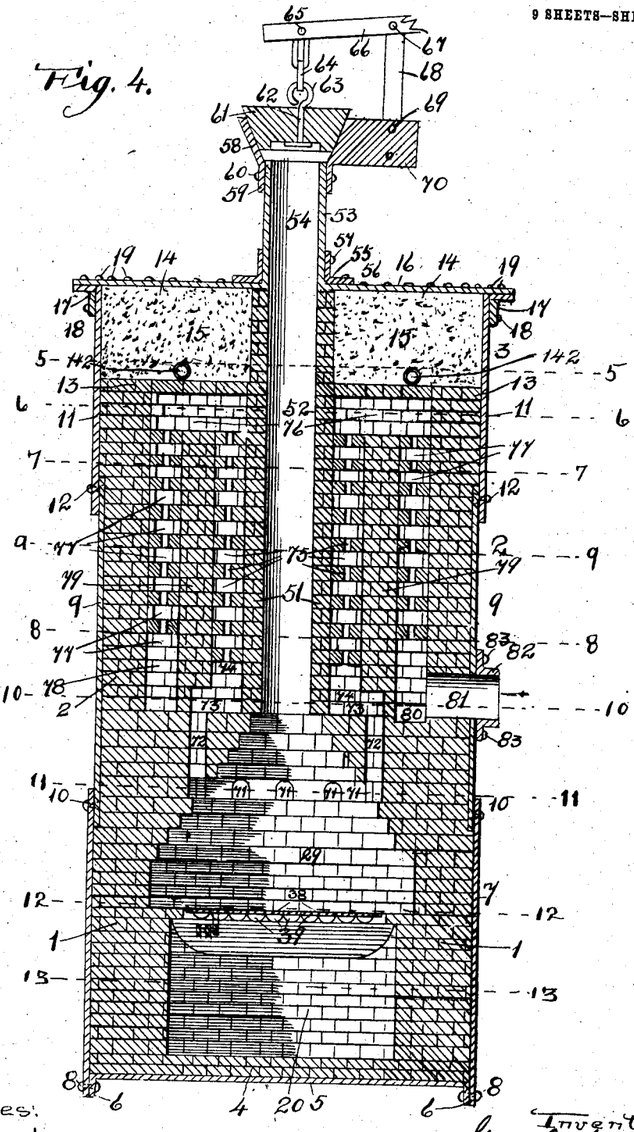
Fig. 4, a sectional elevation of one of the generators.
Figures 5, 14, 16:
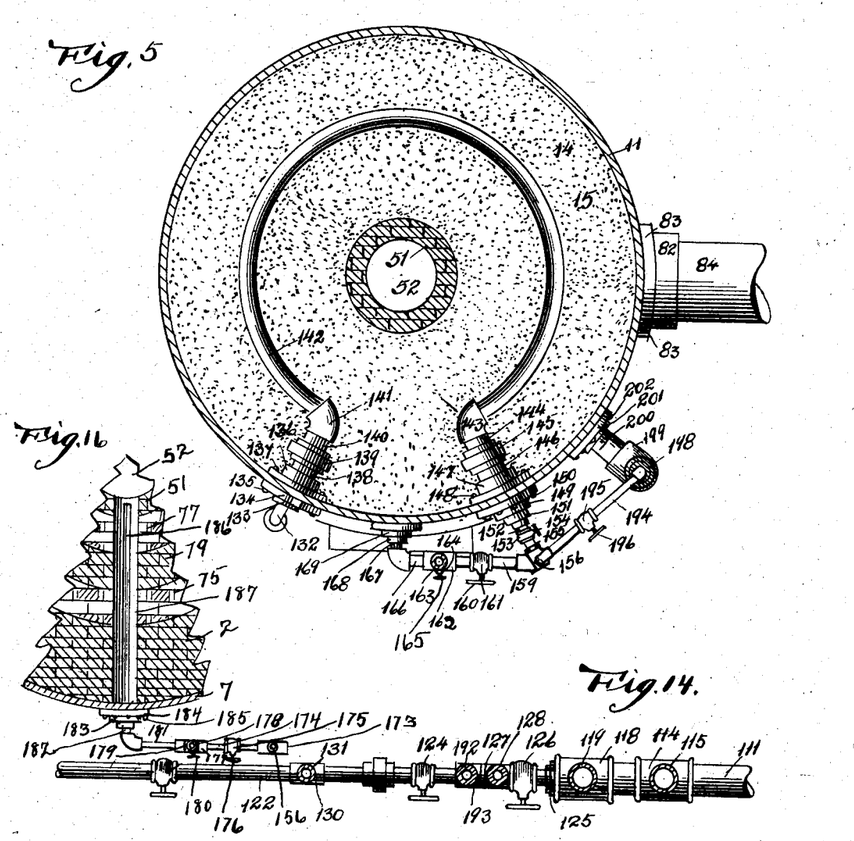
Fig. 5, a cross-section on line 5 of Fig. 4.
Fig. 14, a plan view, partly in section, of the supply-pipe for steam and light hydrocarbons.
Fig. 16, a detail, partly in section, showing the sight-opening passage of the final fixing-chamber.
Figure 6:
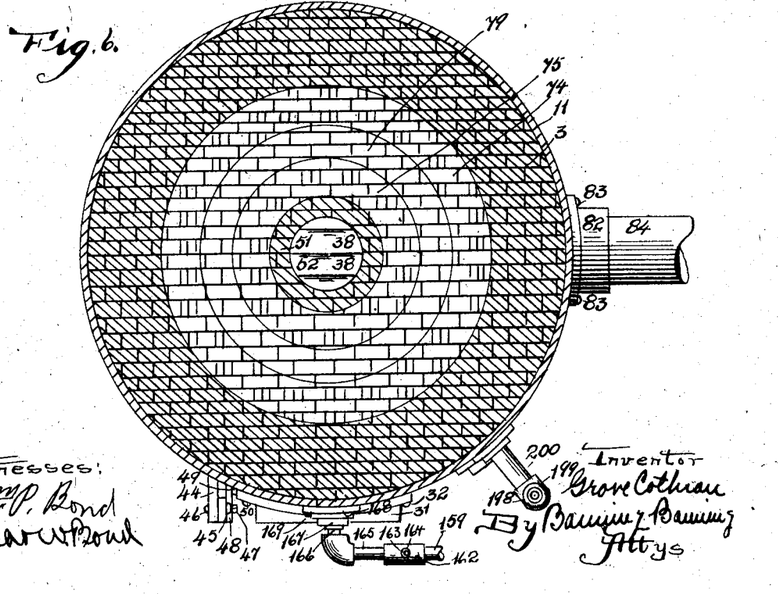
Fig. 6, a cross-section on line 6 of Fig.
Figure 7:
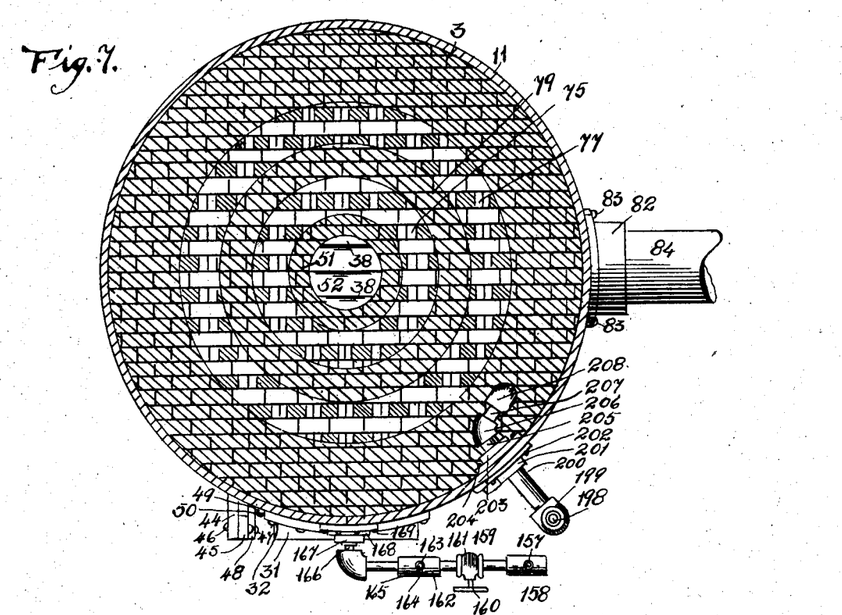
Fig. 7, a cross-section on line 7 of Fig. 4.
Figure 8:
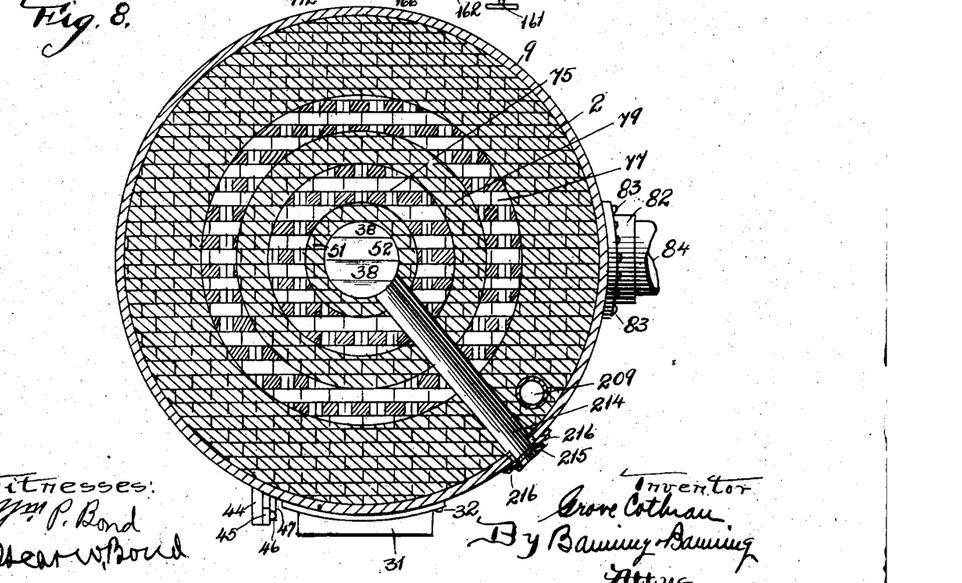
Fig. 8, a cross-section on line 8 of Fig. 4.
Figure 9:
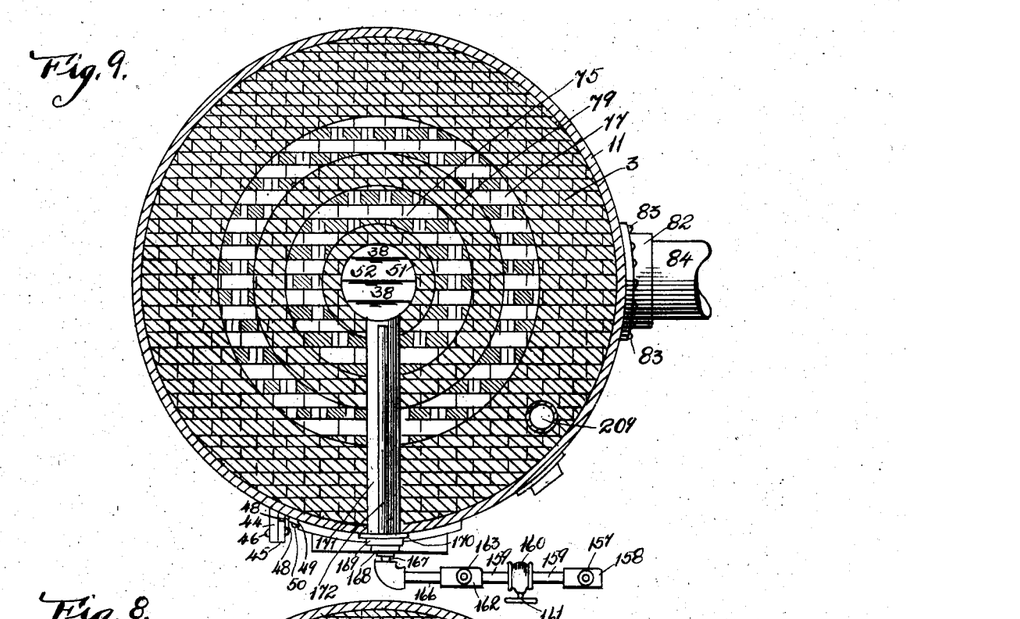
Fig. 9, a cross-section on line 9 of Fig. 4.
Figure 10:
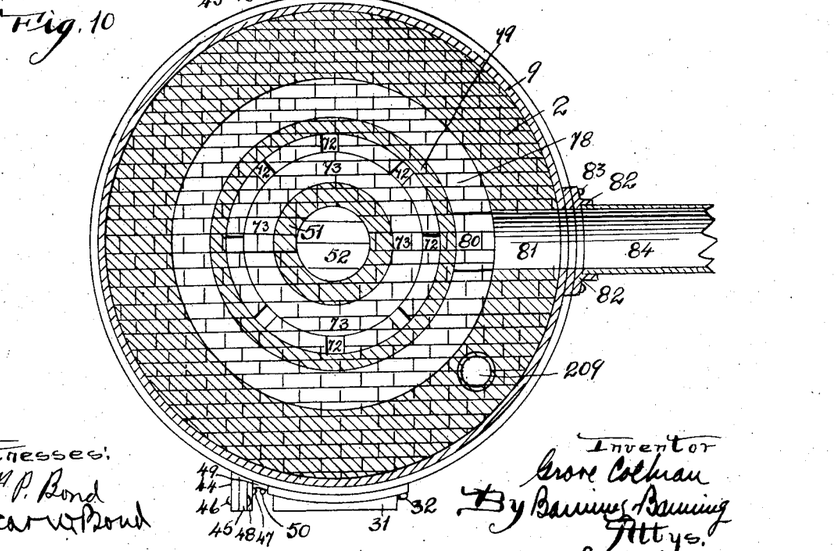
Fig. 10, a cross-section on line 10 of Fig. 4.
Figure 11:
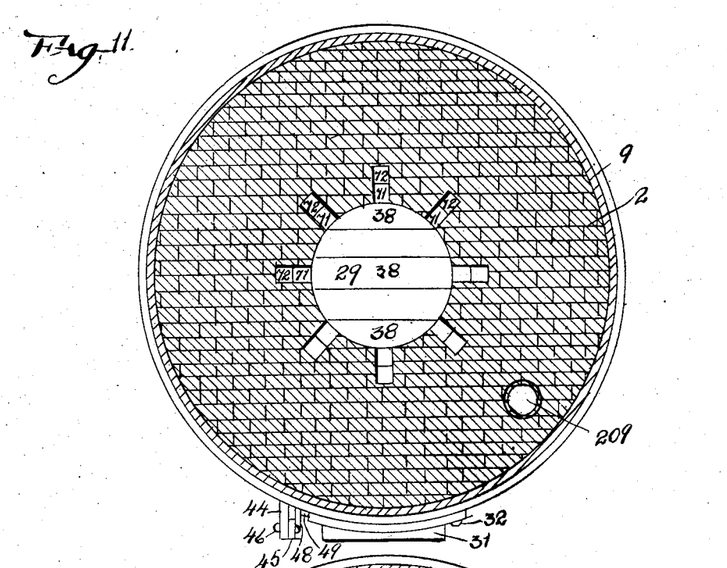
Fig. 11, a cross-section on line 11 of Fig. 4.
Figure 12:
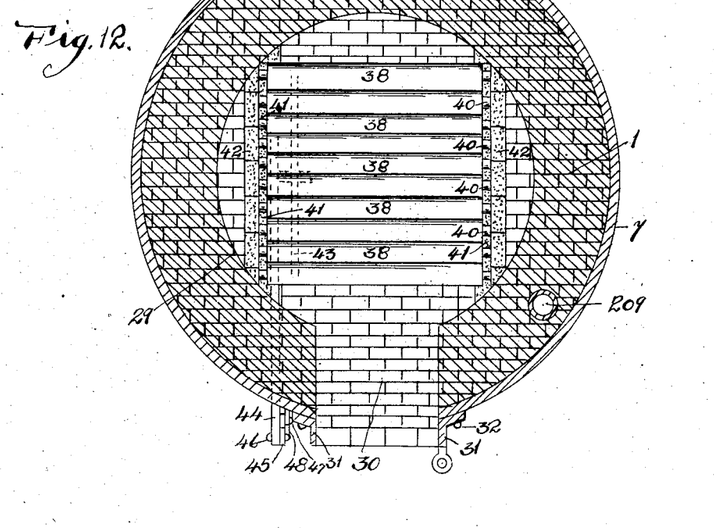
Fig. 12, a detail in section on line 12 of Fig. 4.
Figure 13:
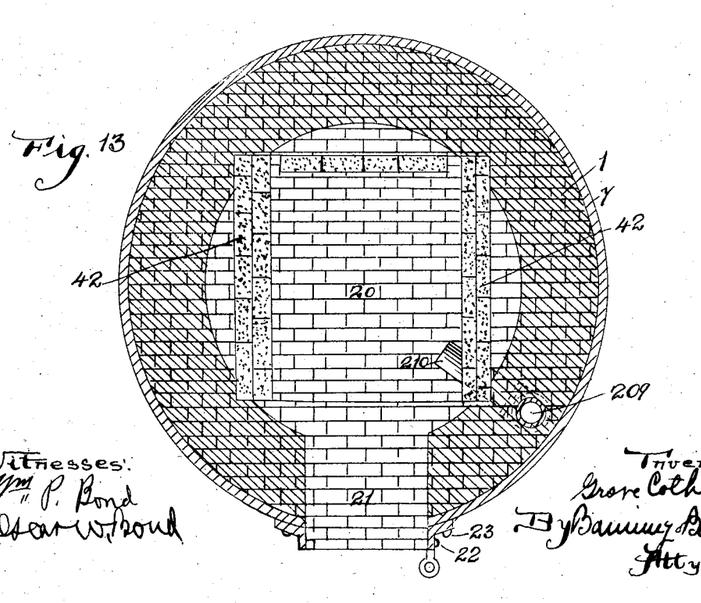
Fig. 13, a detail showing the air and steam pipes.
Figure 15:
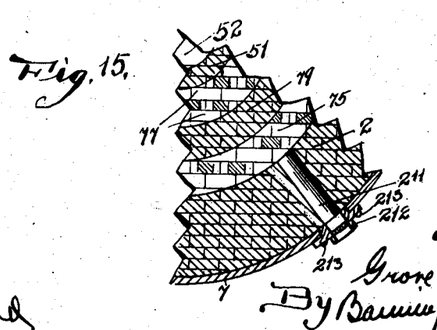
Fig. 15, a detail, partly in section, of the injecting-pipe for heavy carbons.

The construction and arrangement shown employs two generators, each, however, of the same formation, so that a description in detail of a generator will describe the two. The generator is formed of a base or lower portion 1, a central or intermediate portion 2, and a top or upper portion 3, and preferably is cylindrical in cross-section. The several portions are of fire-brick from the top of the generator to the bottom thereof, and at the bottom of the generator is a closure 4 of fire-brick located above a supporting-plate 5, preferably of steel, and having a depending annular rim 6, through which and the lower edge of an inclosing or incasing cylinder 7, also preferably of steel, rivets 8 pass, securing the bottom plate to the incasing or inclosing cylinder 7 for the base of the generator. The center or intermediate section or division of the generator is incased or inclosed within a cylinder 9, also preferably of steel, secured at its lower edge within the upper edge of the cylinder 7 by rivets 10 or otherwise in the arrangement shown. The top or upper portion of the generator is incased or inclosed by a cylinder 11, also preferably of steel, the lower edge of which is attached to the upper edge of the cylinder 9 by rivets 12 in the arrangement shown. The cylinder 11 extends above the closure-top 13 of the generator proper and forms a chamber 14, which is filled with sand and asbestos 15, for heat-retaining purposes at the top of the generator proper. A cap-plate or cover 16 is attached to the upper edge of the cylinder 11 by an angle-iron band 17 and rivets 18, passing through the band 17 and the wall of the cylinder 11, and by rivets 19, passing through the band and the plate or cap 16 in the form of construction shown.

The base 1 has located therein an ash-pit 20, leading from which on one side is an exit or opening 21, surrounded by a casing 22, attached by rivets 23 or otherwise to the cylinder 7 and having hinged to the casing a door 24, secured by a locking bar or latch 25, as usual, for closing the exit or opening 21 and allowing access to the ash-pit when the door is opened for removing the ashes. A sight-opening 26 is formed in the wall of the base 1 and through the cylinder 7, which opening is encircled by a flange 27, having a glass, as usual, and attached to the cylinder 7 by rivets 28 or otherwise, through which opening an inspection of the ash-pit can be had without opening the door of the ash-pit.

A fuel or fire chamber 29 is formed partly in the base 1 and partly in the intermediate or central section 2 of the generator, and this fire or fuel chamber 29 is in the form, preferably, of a truncated cone, wider at the base than at the top. A passage 30 leads from the base of the fire or fuel chamber on one side and extends through the cylinder 7 of the base and is encircled by a casing 31, attached to the cylinder 7 by rivets 32 or otherwise, and the casing has hinged thereto a door 33, having a locking latch or bar 34, as usual, so that by opening the door access can be had to the lower portion or base of the fire or fuel chamber and by closing the door the fire or fuel chamber will be completely closed. A sight-passage 35 is located in the wall of the central section or division of the generator and opens into the upper portion of the fire or fuel chamber, and leads through the cylinder 9 and is encircled by a flange 36, having a glass and secured to the cylinder 9 by rivets 37 or otherwise. This sight opening or passage enables an inspection of the upper portion of the fuel-chamber to be obtained for ascertaining the condition of the fuel or incandescent material. A grate, consisting of rocking bars 38, is located between the ash-pit and the bottom of the fire or fuel chamber, each grate having a bearing portion 39 with a pivot 40 at each end supported in a cross plate or bar 41, mounted on the side walls 42 of the ash-pit, and the rocking bars are actuated by means of depending arms and a connecting-rod 43, through a rod 44, projecting out through the wall of the base and the cylinder 7 and connected with a lever 45 by a pivot 46 with the lever at its fixed end attached by a pivot 47 to a bracket 48, having an ear 49, by means of which and a rivet 50 or otherwise the bracket is attached to the cylinder 7, so that by moving the lever or arm 45 the rod or bar 44 will be reciprocated to rock the bars of the grate, as usual.

A central annular wall 51 extends up from the open apex end of the fire or fuel chamber 29 and terminates in the top plane of the filling of the chamber 14, and this wall incloses or surrounds the vaporizing-chamber 52 of the generator. A metal tube 53 in the arrangement shown extends up from the top of the wall 52 and incloses or surrounds a passage 54, forming a continuation of the chamber 52, and this tube 53 is attached to the top plate 16 by an angle-collar 55 and rivets 56 and 57, entered, respectively, into the top plate 16 and the wall of the tube 53; but the tube could be otherwise held in position. A funnel-shaped top 58, having a ring or band 59 at its lower edge, is attached by rivets 60, passing through the band and the wall of the tube, and into this top is entered a cover 61, having a central pin 62 with an eye 63, receiving a chain 64, attached to a pin 65 of a lifting-lever 66, supported by a pin or pivot 67 on a standard or upright 68, attached by bolts 69 or otherwise to a support 70, extending laterally from the cap 58 in the arrangement shown. The cap 61 is raised for the purpose of charging the fuel or fire chamber with the fuel, such as coal or coke, which is deposited in the fuel or fire chamber through the passage 54 and chamber 52, and after charging the generator with the fuel the cap 61 is closed and remains closed during the operation of the generator in producing the gas.

A series of openings or outlets 71 is formed in the wall of the fire or fuel chamber below the top thereof, and these outlets or openings 71 each lead into an upwardly-extending flue or passage 72, each of which has an opening or mouth 73, leading into an annular passage 74, surrounding the wall 51 of the initial fixing-chamber, and in this annular passage is located checker-work 75, which terminates below the top 13 of the brickwork of the generator, leaving a passage or chamber 76 over an annular checker-work 77, located in an annular passage 78, separated from the annular passage 74 by a wall 79, the top of which in the form shown is in the plane of the top of the checker-work 75 and 77. The wall of the central or intermediate section 2 of the generator has formed therein, on one side in line with the annular passage 78, a depression 80, which communicates with a lateral passage or outlet 81, formed in the wall of the generator and leading through the inclosing cylinder 9 and furnishing an outlet for the gas from the final fixing-chamber, formed of the annular passages 74 and 78 and the checker-work 75 and 77, the checker-work furnishing a retarding of the flow of the vapor in its passage to the outlet 81, by which the generated gas will be subjected to heat so as to remove the vaporous portion, leaving only the permanent gas.

A flange 82 surrounds the outlet or discharge opening 81 for the permanent gas, and this flange is attached to the shell or cylinder 9 by rivets 83 or otherwise and has entered thereinto a nipple or pipe 84, the other end of which is entered into a coupling 85, having a nipple 86, to which is attached a valve 87, leading from which is a pipe 88, forming the direct draft for blowing up or starting the generator. A lever 89 is attached by a pivot 90 to the stem 91 of the valve-gate, and this lever 89 is attached by a pin or pivot 92 to a link 93, attached by a pin or pivot 94 to ears or a shoulder on the casing of the valve, so that by moving the lever 89 the gate of the valve can be operated to open or close the direct draft of the pipe or tube 88 from the fuel or fire chamber of the generator. The coupling 85 has a nipple 95 entered into one side thereof, and the nipple is also entered into a coupling 96, so that the nipple 84, coupling 85, nipple 95, and coupling 96, when the gate of the valve 87 is closed, furnish a conduit for the permanent gas from the final fixing-chamber of the generator. A nipple 97 connects the coupling 96 with a coupling 98, and the coupling 98 is connected by a nipple 99 with a flange 100, attached by rivets 101 or otherwise to the top of the cylinder 102 of the water seal. A supply-pipe 103 for the water to the seal enters the cylinder 102 adjacent to the top in the arrangement shown, and a pipe 104 leads from the top of the cylinder 102 for conducting the gas from the water seal to the point of final manipulation. The cylinder 102 of the water seal has a manhole or handhole 105, closed by a cover 106, secured by a locking latch or catch 107, and through which hole the deposited tar and other heavy substances or material can be removed from the water seal. A trap 108 is connected with the water seal at the point for the desired height of water, and this trap has a valve 109 with a stem 110, by means of which the water can be withdrawn, so as to maintain the level for the water in the seal, as usual.

An air-pipe 111 in the arrangement shown is located in front of the generators and has a T-coupling 112, connected with which is a pipe 113, leading from the source of air-supply, which may be an air compressor or fan that will furnish air to the pipe 111 under a pressure of three pounds more or less. The air-pipe 111 has two couplings 114, with each of which is connected a relief or blow-off pipe 115, one pipe for each generator. The communication between the coupling 114 and pipe 115 is controlled by a valve 116, the gate of which is actuated by a lever 117, essentially as described for the operation of the gate of the valve 87. The air-pipe 111 has two couplings 118, from each of which leads a pipe 119, one pipe for each generator, and the communication between each coupling 118 and its pipe 119 is controlled by a valve 120, the gate of which is actuated by a lever 121, essentially as described for the operation of the valve 87. A steam-supply pipe 122 is entered into each end of the air-supply pipe at the couplings 118, and this steam-supply pipe for each side thereof has a valve 123 and a valve 124 in the arrangement shown. The end of the coupling 118 receiving the steam-supply pipe 122 has a reducing-plug 125, and adjacent to the reducing-plug in the steam-supply pipe is a valve 126 for controlling the air at the point of admission into the pipe 122. The steam-pipe 122 adjacent to the valve 126 has a T-coupling 127, leading from which is a pipe 128, which enters the pipe 119 at a point above the controlling-valve 120, and communication for the pipe 128 with the steam-supply pipe is controlled by a valve 129, so that by closing the valve 126 and opening the valve 129 steam can be supplied direct to the pipe or tube 119 above the controlling-valve 120 thereof, or by closing the valve 129 and opening the valve 126 and opening the valve 120 steam and air commingled can be supplied to the pipe 119, as may be desired.

The steam-supply pipe 122 has a nipple 130, leading from which is a pipe 131, connected at its upper end to a short pipe or nipple 132, which enters a reducer 133, attached to a flange 134, secured by rivets 135 or otherwise to the metal cylinder 11 of the upper section or portion of the generator-casing. A flange 136, attached by rivets 137 or otherwise to the inner face of the metal cylinder 11, receives a nipple 138, entered into a coupling 139 on a nipple 140, entered into an elbow 141, leading from which is a coil-pipe 142, the other end of which enters an elbow 143, attached by a nipple 144 to a coupling 145, leading from which is a nipple 146, entered into a flange 147, attached by rivets 148 or otherwise to the inner face of the cylinder 11, and a flange 149 is attached by rivets 150 to the outer face of the cylinder 11 and receives a reducer 151, into which is entered a nipple 152, connected with a valve 153, having a stem 154, and the valve 153 is connected by a nipple 155 with a T-coupling 156, leading out from which is a pipe 157, which extends to the pipe 122 for the steam. The coil-pipe 142 is of greater capacity than the supply-pipe for steam thereto and the discharge-pipe for steam therefrom, and this coil-pipe 142 is located in the chamber 14, where it is subject to the heat of the generator, so that steam supplied thereto will become superheated when discharged therefrom into the lead-pipe 157, giving superheated steam for action in cutting the coil or other liquid hydrocarbon. A good ratio of proportions between the steam-supply and steam-discharge pipes and the coil 142 is a half-inch pipe for the steam supply and discharge pipes and a two-inch pipe for the coil; but these proportions can be varied so long as the capacity of the coil is an increased one as compared with the supply and discharge pipes, so as to furnish an excess of steam within the coil-pipe, by which the superheating of the steam will be positively effected, as the discharge through the smaller pipe will insure a detention of a body of steam within the coil to become superheated.

The discharge or lead pipe 157 has a T-shaped coupling 158, leading from which is a pipe 159, having therein a valve 160 with a stem 161 for closing communication through the pipe. The pipe 159 leads into a coupling 162, into which is entered the end of an oil or liquid-hydrocarbon supply pipe 163, having a valve 164 with a stem 165 for controlling the passage of oil through the pipe. A pipe 166 leads from the T-coupling and is connected by an elbow with a nipple or short pipe 167, entered into a reducer 168, attached to a flange 169, secured by rivets 170 or otherwise to the shell or cylinder 11, inclosing the upper portion of the generator. The flange 169 is attached in line with a conduit or passage 171, formed within the wall of the generator and terminating at its inner end through the wall 51, and in this conduit or passage 171 is located a discharge-pipe 172 in line with the reducer and terminating just short of the end of the conduit or passage, in which pipe or tube the steam cuts the liquid hydrocarbon for discharge into the vaporizing-chamber to strike the heated wall of such chamber and become broken up and vaporized by the combined effects of the heat and contact with the wall. A T-coupling 173 is located in the pipe 157 and has connected thereto one end of a pipe 174, having a valve 175 with a valve-stem 176, and this pipe 174 is entered into a coupling 177, into which is entered the lower end of a supply-pipe 178 for tar or other heavy inflammable or liquid hydrocarbon. The pipe 178 has a valve 179 with a valve-stem 180 for controlling the passage of the tar or other heavy hydrocarbon liquid. A pipe 181 leads from the coupling 177 and is connected with a nipple 182, entered into a reducer 183, connected with a flange 184, attached by rivets 185 or otherwise to the cylinder 11 of the inclosing casing or shell of the generator. A conduit or passage 186 is formed in the wall of the generator, its inner end terminating through the wall 51, and this conduit or passage is in line with the flange and has located therein a tube 187 in line with the reducer and terminating at its inner end short of the inner end of the conduit or passage and through which tar or other heavy liquid hydrocarbon commingled with superheated steam can be discharged into the vaporizing-chamber 52, striking the wall 51 and becoming broken up and vaporized by the heat and contact to descend into the fuel or fire chamber.

The lower end of the pipe 157 is attached to a coupling 188, connected by a nipple 189 with a valve 190, having a stem 191, and the valve is connected by a nipple 192 with a T-coupling 193 on the steam-supply pipe 122, so that by opening the valve 190 direct steam can be supplied to the pipe 157 without passing through the superheating-coil. A pipe 194 leads from the coupling 156 and has a valve 195 with a stem 196 and is connected by an elbow with a pipe 197 entered into a reducer 198 in the end of a coupling 199 at the upper end of the pipe 119, so that superheating-steam can be supplied into the coupling from the superheated coil. A nipple or short pipe 200 is entered into the coupling 199 and is connected with a flange 201, attached by rivets 202 or otherwise to the outer face of the cylinder 11 of the shell or casing of the generator, and a flange 203, in line with the flange 201, is attached by rivets 204 or otherwise to the inner face of the cylinder 11 and has connected therewith a nipple 205, entered into an elbow 206, to which is connected a nipple 207, entered into an elbow connected with a pipe 209, leading down within the brick wall of the generator and terminating in a mouth or discharge 210 in the ash-pit below the grate for discharging air, or commingling air and steam, or steam into the ash-pit to pass up through the incandescent material within the fire or fuel chamber.

A passage 211 is formed in the wall of the center or intermediate section of the generator and extends through the plate or cylinder 9 of the inclosing casing or shell and is encircled by a flange 212, having a glass and attached by rivets 213 or otherwise to the cylinder 9, and this passage or opening enables an inspection of the final fixing-chamber to be obtained, as required. A passage 214 is formed in the wall of the upper section of the generator and extends through the plate or cylinder 11 of the inclosing shell or casing and is surrounded by a flange 215, having a glass and attached by rivets 216 or otherwise to the cylinder, and this passage enables the vaporizing-chamber to be inspected as may be required. An opening 217 is formed through the wall of the ash-pit and the plate or cylinder 7 and is surrounded at its outer end by a flange 218, attached by rivets 219 or otherwise to the cylinder 7, and this flange has entered thereinto a plug 220 for closing the opening or hole 217, which opening or hole is for the purpose of furnishing a draft to maintain the fuel in the fire-chamber at normal condition when the generator is not in operation.

After the fire or fuel chamber has been charged with the fuel air is admitted into the pipe 119 by opening the valve 120, and this air passes up the pipe 119 and through the connection with the coupling 199 enters the pipe 209 and is discharged into the ash-pit below the grate to pass up through the fuel on the grate in the fire-pot or fuel-chamber and out through the passage 81 into the draft-pipe 88, the valve 87 of which is open, and the blast is continued until the furnace or generator is brought to the incandescent condition for the fuel, and the vaporizing and fixing chambers are thoroughly incandescent for the operation of vaporizing and forming the permanent gas. The steam during the initial heating of the generator to an incandescent state is shut off, and when the incandescent condition is reached the air-supply through the pipe 119 is completely shut off and a small amount of air is admitted to the pipe 119 by opening the valve 126 for the air to enter the coupling and pass into the down pipe or flue 209 for discharge into the ash-pit. The valve 123 of the steam-supply pipe 122 is then opened, and the valve 124 of that pipe and the valve 190 of the pipe 157 are closed, so that steam will pass up through the pipe 131 and enter the coil 142 and become superheated in its passage through the coil and into the discharge-pipe 157 for operation on the oil or hydrocarbon. The valve in the pipe 159 is then opened for oil or liquid hydrocarbon and the valve in the pipe 174 is closed; but for tar or heavy hydrocarbon the valve in the pipe 159 is closed and the valve in the pipe 174 is opened.

The oil or light hydrocarbon is fed into the coupling 162 from the pipe 163, and steam is also supplied to the coupling through the pipe 159 for the oil and steam to commingle and the steam to cut the oil and discharge the combined oil and steam into the vaporizing-chamber 52 to be broken up and partially vaporized in such chamber. The valve 195 is opened, allowing superheated steam to enter the coupling 199 to commingle with the air-supply from the pipe 119 and for the combined steam and air to pass out through the pipe or flue 209 into the ash-pit and ascend through the fuel or incandescent material on the grate and within the fuel or fire chamber, and by this arrangement enough air is admitted with the steam to maintain the incandescent condition of the fuel for a longer period of time than would be the case if steam without the air was only supplied to pass through the fuel or incandescent material. The disintegrated steam and the vapor from the vaporizing-chamber are brought together in the upper portion of the fuel or fire chamber and commingles at the point of discharge from the fuel or fire chamber through the passages 71 into the passages 72, entering the passage or chamber 74 and passing up through the checker-work 75 into the passage or chamber 76 and down through the checker-work 77 to the discharge opening or passage 81, and during such passage the gaseous vapor is subjected to the heat of the walls and checker-work from the point of admission in the chamber or passage 74 to the point of discharge at the mouth or opening 81, thereby changing the vaporous condition into that of a permanent gas when leaving the generator to pass to the water seal. The operation of admitting oil or liquid hydrocarbon is continued until the incandescent material becomes dulled or reduced in temperature, when the supply of oil or liquid hydrocarbon is shut off and the fuel or incandescent material is brought to an incandescent condition by again blowing up the generator through air supplied through the pipe 119, as already described, the steam being shut off during the operation of blowing up the incandescent material in the generator. The blast is again shut off when the incandescent condition is reached and the supply of oil or liquid hydrocarbon and steam is again introduced into the initial fixing-chamber under the conditions described, producing vapor and a permanent gas, and these operations can be continued until the amount of gas required has been generated and stored in the holder or otherwise distributed.

The heavy residuum of the oil or liquid hydrocarbon descending from the vaporizing-chamber into the incandescent material is subjected to heat and is consumed, thereby assisting the incandescent material in maintaining the heat in the generator for vaporizing the oil or liquid hydrocarbon for a longer period of time than can be obtained in the operation of an ordinary generator, and at the same time the heavy portions of the oils or liquid hydrocarbon are destroyed and do not pass into the final fixing-chamber to any great extent, so that in the final fixing-chamber all that is treated is the vaporous product from the oil or liquid hydrocarbon, with the result of leaving only a permanent gas for final discharge, as the purely vaporous portions are removed in the passage through the final fixing-chamber. It will thus be seen that by discharging the hydrocarbon vapor at a point below the apex or upper end of the fuel or fire chamber the heavy products or portions of the oils or liquid hydrocarbons are burned and destroyed, leaving only the vapor to pass into the final fixing-chamber for gasification. The delivering or forcing of the vapor and the products from the oil or liquid hyrdocarbon to discharge at a point below the top or apex end of the fuel-chamber gives an increase in the amount of vapor produced and also adds a heating material in the shape of the heavy consumable products by which the heat of the generator is maintained without additional fuel and for a longer period of time than the ordinary practice in operating gas-generators.

The operation where tar or heavy hydrocarbons are used is precisely the same as described for the operation of oils or liquid hydrocarbons, the tar or heavy oils or hydrocarbons being introduced into the vaporizing-chamber to vaporize the same and have the heavy portions and the vapor pass into the fuel or into the incandescent material in the fuel or fire chamber and out through the final fixing-chamber, the heavier portions adding materially to maintain the heat of the generator, as already described.

It will be seen that with the gas-generator of the present invention a perfect control of air under pressure for blowing up or bringing the furnace to an incandescent condition is obtained by forcing the air into the ash-pit to pass up through the incandescent material or fuel in the fire-chamber; that after the furnace is brought to the incandescent state or condition the supply of air can be reduced to a minimum pressure and steam can be passed through a superheating-coil for a portion thereof to commingle or combine with the small amount of admitted air under pressure to pass into the ash-pit and up through the incandescent material or fuel in the fire or fuel chamber, for the steam to be disintegrated into its component elements, and for the small supply of air to maintain the incandescent condition of the fuel or material in the fire-chamber and the furnace or generator at an incandescent heat for a much longer period of time than can be attained where steam alone is passed through incandescent material or fuel; that the superheated steam can be brought into contact with the supply of oil or other liquid hydrocarbon to cut the oil or other liquid hydrocarbon for discharge into the vaporizing-chamber above and in direct communication with the incandescent material or fuel in the fire or fuel chamber for the oil to be vaporized and passed down into the incandescent material or fuel; that the disintegrated steam and the vaporized oil or other liquid hydrocarbon are brought together in the upper portion of the fire or fuel chamber and within the body of the incandescent material or fuel, subject to the intense heat of the incandescent material or fuel, by which a thorough and effectual vaporization of the ingredients is positively secured; that the produced vapor passes from the mass or body of incandescent material or fuel into a final fixing-chamber and in its passage through such chamber is broken up, deflected, and its travel retarded, so as to subject the vapor to the heat of the fixing-chamber for a sufficient period of time by which the non-gaseous or non-inflammable vaporous portions will be obliterated, leaving only a fixed permanent gas for delivery to the water seal, and that the heavy portions or residuum of the oil or other liquid hydrocarbon are brought into direct contact with the incandescent material or fuel and add to the heating properties of the furnace and assist in maintaining the generator in its gas-producing state or condition for a greater period of time than would be the case if the by-products or residuum were not carried into the fire or fuel chamber. The vaporizing within the mass or body of the incandescent material or fuel increases the volume of vapor and gas produced, and the adding of the inflammable portions of the heavy products or residuum to the incandescent material or fuel gives an increase in the output of gas, as well as insuring the production of a fixed permanent gas for further treatment in making a heating or illuminating gas. The heavy by-products or residuum passing into the incandescent material or fuel enables the starting or blowing up of the furnace to its incandescent condition to be more rapidly and easily consumed, as the inflammable by-products or residuum will burn very quickly and readily and by their heat cause a more rapid bringing of the furnace and the incandescent material or fuel to the operating condition for making gas.

While the apparatus has been described with more or less particularity as regards details of construction, it is not intended thereby to limit the construction any more than is pointed out in the claims, as changes in form and arrangement of the air-supply and the steam-supply can be varied without departing from the spirit of the invention, so long as the furnace or generator has therein a fire or fuel chamber for the incandescent material or fuel, with a direct lead thereinto from a vaporizing-chamber and an outlet therefrom below the top of the incandescent material or fuel into a final fixing-chamber for delivering only a fixed and permanent gas from the final fixing-chamber for further manipulation.

What I claim as new, and desire to secure by Letters Patent, is—

1. In a gas-generator, the combination of a conical fire-pot having below its apex end and within the transverse plane of the upper portion of the fuel lateral passages each passage opening into an upwardly-extending vertical passage, a vaporizing-chamber above and in direct communication with the apex end of the fire-pot and of the full cross-section area of the apex end of the fire-pot, the vaporizing-chamber receiving thereinto to be vaporized a projected stream of commingled hydrocarbon and superheated steam, and a final fixing-chamber having communication with the vertical passages of the fire-pot, for drawing the vapor produced in the vaporizing-chamber downwardly into the incandescent material in the fire-pot to escape therefrom laterally and enter the lower end of the final fixing-chamber, thereby increasing the gaseous vapor and adding the heavier material for maintaining the heat of the fire-pot and generator, substantially as described.

2. In a gas-generator, the combination of a conical fire-pot having below its apex end and within the transverse plane of the upper portion of the fuel lateral passages each passage opening into an upwardly-extending vertical passage, a vaporizing-chamber above and in direct communication with the apex end of the fire-pot and of the full cross-section area of the apex end of the fire-pot, the vaporizing-chamber receiving thereinto to be vaporized a projected stream of commingled hydrocarbon and superheated steam, a final fixing-chamber surrounding the vaporizing-chamber having communication with the vertical passages of the fire-pot for receiving thereinto at its lower end from below the top of the fuel in the fire-pot the gaseous vapors produced in the vaporizing-chamber and downwardly drawn into the incandescent material in the fire-pot, checker-work partly filling and closing the passages of the final fixing-chamber and through which the withdrawn vapor from the fire-pot passes, and an outlet leading from the final fixing-chamber at its lower end for discharging the permanent gas, substantially as described.

3. In a gas-generator, the combination of a conical fire-pot having below its apex end and within the transverse plane of the upper portion of the fuel lateral passages each passage opening into an upwardly extending vertical passage, a vaporizing-chamber above and in direct communication with the apex end of the fire-pot and of the full cross-section area of the apex end of the fire-pot, the vaporizing-chamber receiving thereinto to be vaporized a projected stream of commingled hydrocarbon and superheated steam, a final fixing-chamber surrounding the vaporizing-chamber and consisting of annular passages with the inner passage in communication with the vertical passages of the fire-pot for laterally withdrawing vapor from within the incandescent material into the lower end of the inner passage of the fixing-chamber, checker-work partly filling and closing each annular passage of the final fixing-chamber, and an outlet for permanent gas leading from the lower end of the outermost passage of the final fixing-chamber, substantially as described.

4. In a gas-generator, the combination of a conical fire-pot having below its apex end and within the transverse plane of the upper portion of the fuel lateral passages each passage opening into an upwardly-extending vertical passage, a vaporizing-chamber above and in direct communication with the apex end of the fire-pot and of the full cross-section area of the apex end of the fire-pot, the vaporizing-chamber receiving thereinto to be vaporized a projected stream of commingled hydrocarbon and superheated steam, a final fixing-chamber surrounding the vaporizing-chamber and consisting of annular passages with the inner passage in communication with the vertical passages of the fire-pot for laterally withdrawing vapor from within the incandescent material into the lower end of the inner passage of the fixing-chamber, checker-work partly filling and closing each annular passage of the final fixing-chamber, an outlet for permanent gas leading from the lower end of the outermost passage of the final fixing-chamber, a pipe connection leading from the outlet for permanent gas, and a draft-pipe in communication with the pipe connection, substantially as described.

5. In a gas-generator, the combination of a conical fire-pot having below its apex end and within the transverse plane of the upper portion of the fuel lateral passages each passage opening into an upwardly - extending vertical passage, a vaporizing-chamber above and in direct communication with the apex end of the fire-pot and of the full cross-section area of the apex end of the fire-pot, the vaporizing - chamber receiving thereinto to be vaporized a projected stream of commingled hydrocarbon and superheated steam, a final fixing-chamber surrounding the vaporizing-chamber and consisting of annular passages with the inner passage in communication with the vertical passages of the fire-pot for laterally withdrawing vapor from within the incandescent material into the lower end of the inner passage of the fixing - chamber, checker-work partly filling and closing each annular passage of the final fixing-chamber, an outlet for permanent gas leading from the lower end of the outermost passage of the final fixing-chamber, a pipe connection leading from the outlet for permanent gas, a draft-pipe in communication with the pipe connection, and means for supplying superheated steam and air below the incandescent material in the fire-pot to pass upwardly into the incandescent material and combine with the hydrocarbon vapors, substantially as described.

6. In a gas-generator, the combination of a conical fire-pot having below its apex end and within the transverse plane of the upper portion of the fuel lateral passages each passage opening into an upwardly - extending vertical passage, a vaporizing-chamber above and in direct communication with the apex end of the fire-pot and of the full cross-section area of the apex end of the fire-pot, the vaporizing-chamber receiving thereinto to be vaporized a projected stream of commingled hydrocarbon and superheated steam, a final fixing-chamber surrounding the vaporizing-chamber and consisting of annular passages with the inner passage in communication with the vertical passages of the fire-pot for laterally withdrawing vapor from within the incandescent material into the lower end of the inner passage of the fixing - chamber, checker-work partly filling and closing each annular passage of the final fixing-chamber, an outlet for permanent gas leading from the lower end of the outermost passage of the final fixing-chamber, a pipe connection leading from the outlet of the final fixing-chamber, and a water seal in communication with the pipe connection, substantially as described.

7. In a gas-generator, the combination of a conical fire-pot having below its apex end and within the transverse plane of the upper portion of the fuel lateral passages each passage opening into an upwardly - extending vertical passage, a vaporizing-chamber above and in direct communication with the apex end of the fire-pot and of the full cross-section area of the apex end of the fire-pot, the vaporizing-chamber receiving thereinto to be vaporized a projected stream of commingled hydrocarbon and superheated steam, a final fixing-chamber surrounding the vaporizing-chamber and consisting of annular passages with the inner passage in communication with the vertical passages of the fire-pot for laterally withdrawing vapor from within the incandescent material into the lower end of the inner passage of the fixing - chamber, checker-work partly filling and closing each annular passage of the final fixing-chamber, an outlet for permanent gas leading from the lower end of the outermost passage of the final fixing-chamber, a pipe connection leading from the outlet of the final fixing-chamber, a water seal in communication with the pipe connection, and a draft-pipe in communication with the pipe connection, substantially as described.

8. In a gas-generator, the combination of a conical fire-pot having below its apex end and within the transverse plane of the upper portion of the fuel lateral passages each passage opening into an upwardly-extending vertical passage, a vaporizing-chamber above and in direct communication with the apex end of the fire-pot and of the full cross-section area of the apex end of the fire-pot, the vaporizing-chamber receiving thereinto to be vaporized a projected stream of commingled hydrocarbon and superheated steam, a final fixing-chamber surrounding the vaporizing-chamber and consisting of annular passages with the inner passage in communication with the vertical passages of the fire-pot for laterally withdrawing vapor from within the incandescent material into the lower end of the inner passage of the fixing-chamber, checker-work partly filling and closing each annular passage of the final fixing-chamber, an outlet for permanent gas leading from the lower end of the outermost passage of the final fixing-chamber, means for laterally injecting into the vaporizing-chamber commingled oil and superheated steam, and means for projecting commingled steam and a small quantity of air into the incandescent material from below for combining the vapor of the hydrocarbon and the disintegrated steam within the incandescent material to pass laterally therefrom into the final fixing-chamber, substantially as described.

9. In a gas-generator, the combination of a conical fire-pot having below its apex end and within the transverse plane of the upper portion of the fuel lateral passages each passage opening into an upwardly-extending vertical passage, a vaporizing-chamber above and in direct communication with the apex end of the fire-pot and of the full cross-section area of the apex end of the fire-pot, the vaporizing-chamber receiving thereinto to be vaporized a projected stream of commingled hydrocarbon and superheated steam, a final fixing-chamber surrounding the vaporizing-chamber and consisting of annular passages with the inner passage in communication with the vertical passages of the fire-pot for laterally withdrawing vapor from within the incandescent material into the lower end of the inner passage of the fixing-chamber, checker-work partly filling and closing each annular passage of the final fixing-chamber, an outlet for permanent gas leading from the lower end of the outermost passage of the final fixing-chamber, a pipe laterally entered into the wall of the generator and in communication with the vaporizing-chamber for projecting commingled hydrocarbon and superheated steam into the vaporizing-chamber, and means for introducing steam commingled with a small quantity of air into the fuel from below for the vapor of the hydrocarbon and the disintegrated steam to combine with the fuel below the top thereof and pass laterally from within the fuel into the final fixing-chamber, substantially as described.

10. In a gas-generator, the combination of a conical fire-pot having below its apex end and within the transverse plane of the upper portion of the fuel lateral passages each passage opening into an upwardly-extending vertical passage, a vaporizing-chamber above and in direct communication with the apex end of the fire-pot and of the full cross-section area of the apex end of the fire-pot, the vaporizing-chamber receiving thereinto to be vaporized a projected stream of commingled hydrocarbon and superheated steam, a final fixing-chamber surrounding the vaporizing-chamber and consisting of annular passages with the inner passage in communication with the vertical passages of the fire-pot for laterally withdrawing vapor from within the incandescent material into the lower end of the inner passage of the fixing-chamber, checker-work partly filling incandescent material into the lower end of the inner passage of the fixing-chamber, checker-work partly filling and closing each annular passage of the final fixing-chamber, an outlet for permanent gas leading from the lower end of the outermost passage of the final fixing-chamber, a pipe laterally entered into the wall of the generator and in communication with the vaporizing-chamber for projecting commingled hydrocarbon and superheated steam into the vaporizing-chamber, a steam-supply pipe, and a downtake air-conducting pipe located in the wall of the generator and leading into the furnace below the grate of the fire-pot for admitting steam and superheated air under pressure into the fuel from below and creating a blast for firing the furnace, substantially as described.

11. In a gas-generator, the combination of a fire-pot, vaporizing-chamber starting from the apex end of the fire-pot and leading upward and having a direct communication with the fire-pot, a final fixing-chamber surrounding the vaporizing-chamber and having communication below the top of the fire-pot with the vaporizing-chamber, an air-supply pipe, an uptake conducting-pipe leading from the air-supply pipe, a downtake conducting-pipe connected with the uptake conducting-pipe and leading into the furnace below the grate of the fire-pot, for admitting air under pressure into the furnace below the fuel and creating a blast for firing the furnace, and a relief-pipe leading upward from the air-supply pipe, substantially as described.

12. In a gas-generator, the combination of a fire-pot, a vaporizing-chamber starting from the apex end of the fire-pot and leading upward and having a direct communication with the fire-pot, a final fixing-chamber surrounding the vaporizing-chamber and having communication below the top of the fire-pot with the vaporizing-chamber, an air-supply pipe, an uptake conducting-pipe leading from the air-supply pipe, a downtake conducting-pipe connected with the uptake conducting-pipe and leading into the furnace below the grate of the fire-pot for admitting air under pressure into the furnace below the fuel and creating a blast for firing the furnace, a relief-pipe leading upward from the air-supply pipe, a steam-supply pipe connected with the uptake air-conducting pipe, for admitting air and steam into the furnace below the fire-pot, substantially as described.

13. In a gas-generator, the combination of a fire-pot, a vaporizing-chamber starting from the apex end of the fire-pot and leading upward and having direct communication with the fire-pot, a final fixing-chamber surrounding the vaporizing-chamber and having communication below the top of the fire-pot with the vaporizing-chamber, an air-supply pipe delivering air into the furnace below the fire-pot, a steam-supply pipe, an uptake pipe leading from the steam-supply pipe, a coil connected with the uptake steam-pipe and located at the top of and subjected to the heat of the furnace for superheating steam, a downtake superheated-steam pipe connected with the coil, a supply-pipe for a liquid hydrocarbon, and a delivery-pipe leading into the vaporizing-chamber and connected with the hydrocarbon-supply pipe and the superheated-steam-supply pipe, substantially as described.

14. In a gas-generator, the combination of a fire-pot, a vaporizing-chamber starting from the apex end of the fire-pot and leading upward and having direct communication with the fire-pot, a final fixing-chamber surrounding the vaporizing-chamber and having communication below the top of the fire-pot with the vaporizing-chamber, an air-supply pipe leading into the furnace below the fire-pot, a steam-supply pipe connected with the air-supply pipe, an uptake pipe leading from the steam-supply pipe, a coil connected with the uptake steam-pipe and located at the top of and subjected to the heat of the furnace for superheating steam, a downtake superheated-steam pipe connected with the coil and with the air-supply pipe, a supply-pipe for a liquid hydrocarbon, a delivery-pipe leading into the vaporizing-chamber and connected with the superheated-steam-supply pipe and with the liquid-hydrocarbon-supply pipe, substantially as described.

15. In a gas-generator, the combination of a fire-pot, a vaporizing-chamber starting from the apex end of the fire-pot and leading upward and having direct communication with the fire-pot, a final fixing-chamber surrounding the vaporizing-chamber and having communication below the top of the fire-pot with the vaporizing-chamber, an air-supply pipe leading into the furnace below the fire-pot, a steam-supply pipe connected with the air-supply pipe, an uptake pipe leading from the steam-supply pipe a coil connected with the uptake steam-pipe and located at the top of and subjected to the heat of the furnace for superheating steam, a downtake superheated-steam pipe connected with the coil and with the air-supply pipe, a supply-pipe for a liquid hydrocarbon, a delivery-pipe leading into the vaporizing-chamber and connected with the superheated-steam-supply pipe and with the liquid-hydrocarbon-supply pipe, an outlet leading from the final fixing-chamber, a connection between the outlet and the water seal, and a water seal, substantially as described.

16. In a gas-generator, the combination of a fire-pot, a vaporizing-chamber starting from the apex end of the fire-pot and leading upward and having direct communication with the fire-pot, a final fixing-chamber surrounding the vaporizing-chamber and having communication below the top of the fire-pot with the vaporizing-chamber, an air-supply pipe leading into the furnace below the fire-pot, a steam-supply pipe connected with the air-supply pipe, an uptake pipe leading from the steam-supply pipe, a coil connected with the uptake steam-pipe and located at the top of and subjected to the heat of the furnace for superheating steam, a downtake superheated-steam pipe connected with the coil and with the air-supply pipe, a supply-pipe for a liquid hydrocarbon, a delivery-pipe leading into the vaporizing-chamber and connected with the superheated-steam-supply pipe and with the liquid-hydrocarbon-supply pipe, an outlet leading from the final fixing-chamber, a connection between the outlet and the water seal, a water seal, and a draft-pipe in communication with the connection from the outlet of the final fixing-chamber, substantially as described.

GROVE COTHRAN.

Witnesses:
 OSCAR W. BOND,
 WALKER BONNING.